(12) United States Patent
Kim et al.

(10) Patent No.: US 11,805,293 B2
(45) Date of Patent: Oct. 31, 2023

(54) DEVICE AND METHOD FOR TRANSMITTING AND RECEIVING SIGNAL IN MULTIMEDIA SYSTEM

(71) Applicant: Samsung Electronics Co., Ltd., Suwon-si (KR)

(72) Inventors: Dong-Yeon Kim, Seoul (KR); Kyung-Mo Park, Seoul (KR); Jae-Hyeon Bae, Seoul (KR); Young-Wan So, Gunpo-si (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1056 days.

(21) Appl. No.: 16/489,946

(22) PCT Filed: Mar. 28, 2018

(86) PCT No.: PCT/KR2018/003667
§ 371 (c)(1),
(2) Date: Aug. 29, 2019

(87) PCT Pub. No.: WO2018/182313
PCT Pub. Date: Oct. 4, 2018

(65) Prior Publication Data
US 2023/0179826 A1    Jun. 8, 2023

(30) Foreign Application Priority Data
Mar. 29, 2017   (KR) .................. 10-2017-0040338

(51) Int. Cl.
*H04N 21/434*    (2011.01)
*H04N 21/488*    (2011.01)
*H04N 21/845*    (2011.01)

(52) U.S. Cl.
CPC ..... *H04N 21/4345* (2013.01); *H04N 21/4884* (2013.01); *H04N 21/845* (2013.01)

(58) Field of Classification Search
CPC ........... H04N 21/4345; H04N 21/4884; H04N 21/845
USPC ......................................................... 725/32
See application file for complete search history.

(56) References Cited

U.S. PATENT DOCUMENTS 10,244,203 B1 *   3/2019   Enigma .............. H04N 21/8456
10,642,574 B2 *   5/2020   Fleizach ................. G06F 3/167
(Continued)

FOREIGN PATENT DOCUMENTS

CN   101278348 A   10/2008
CN   101600087 A   12/2009
(Continued)

OTHER PUBLICATIONS

Chinese Office Action dated Mar. 29, 2021, issued in Chinese Patent Application No. 201880021673.1.
(Continued)

*Primary Examiner* — Dominic D Saltarelli
(74) *Attorney, Agent, or Firm* — Jefferson IP Law, LLP

(57) ABSTRACT

A method of a transmission device in a multimedia system comprises the steps of: detecting a request for changing first-type data into second-type data while the first-type data is being played at a given point in time; and transmitting, before the second-type data is played, information necessary for replaying data, among the first-type data, played prior to the given point in time, and/or data, among the second-type data, played prior to the given point in time.

8 Claims, 7 Drawing Sheets

(56) References Cited

U.S. PATENT DOCUMENTS

| | | | |
|---|---|---|---|
| 2004/0081434 A1 | 4/2004 | Jung et al. | |
| 2005/0123267 A1 | 6/2005 | Tsumagari et al. | |
| 2006/0078301 A1 | 4/2006 | Ikeda et al. | |
| 2007/0172199 A1 | 7/2007 | Kobayashi et al. | |
| 2009/0300700 A1 | 12/2009 | Yeh et al. | |
| 2010/0098389 A1* | 4/2010 | Shimada | G11B 27/105 |
| | | | 386/E5.068 |
| 2010/0232762 A1 | 9/2010 | Kendall et al. | |
| 2011/0142415 A1 | 6/2011 | Rhyu | |
| 2013/0169762 A1 | 7/2013 | Kanemaru et al. | |
| 2013/0209058 A1 | 8/2013 | Cho et al. | |
| 2013/0219444 A1 | 8/2013 | Kitazato et al. | |
| 2017/0048485 A1 | 2/2017 | Dewa et al. | |
| 2017/0064371 A1 | 3/2017 | Kitazato et al. | |
| 2017/0347134 A1* | 11/2017 | Bae | H04L 69/24 |
| 2017/0353770 A1* | 12/2017 | Jiang | H04N 21/4884 |
| 2019/0090018 A1* | 3/2019 | Yoshizawa | H04H 20/28 |
| 2019/0141361 A1* | 5/2019 | Deshpande | H04N 21/4622 |

FOREIGN PATENT DOCUMENTS

| | | |
|---|---|---|
| CN | 102883172 A | 1/2013 |
| CN | 103257821 A | 8/2013 |
| CN | 106416283 A | 2/2017 |
| EP | 3145210 A1 | 3/2017 |
| JP | 2008-072586 A | 3/2008 |
| JP | 2009-177720 A | 8/2009 |
| JP | 2015-216621 A | 12/2015 |
| KR | 10-2008-0056028 A | 6/2008 |
| KR | 10-0970727 B1 | 7/2010 |
| KR | 10-2011-0066578 A | 6/2011 |
| KR | 10-2011-0110338 A | 10/2011 |
| WO | 2007/142648 A1 | 12/2007 |
| WO | 2017-155371 A1 | 9/2017 |

OTHER PUBLICATIONS

Korean Office Action dated Apr. 26, 2022, issued in Korean Patent Application No. 10-2019-7017763.

Zhang et al., Towards Video Quality of Experience and Selective Attention: A Subtitle-Based Measurement Study, Sep. 1, 2016.

The Research of Scene Change Detection Based on MPEG Soccer Video, Jun. 15, 2010.

Chinese Office Action dated Oct. 27, 2021, issued in Chinese Patent Application No. 201880021673.1.

Extended European Search Report dated Oct. 22, 2019, issued in a counterpart European application No. 18775519.4-1208.

\* cited by examiner (a) MPU with timed media     (b) MPU with non-timed media

DEVICE AND METHOD FOR TRANSMITTING AND RECEIVING SIGNAL IN MULTIMEDIA SYSTEM

CROSS-REFERENCE TO RELATED APPLICATION(S)

This application is a U.S. National Stage application under 35 U.S.C. § 371 of an International application number PCT/KR2018/003667, filed on Mar. 28, 2018, which is based on and claimed priority of a Korean patent application number 10-10-2017-0040338, filed on Mar. 29, 2017, in the Korean Intellectual Property Office, the disclosure of which is incorporated by reference herein in its entirety.

BACKGROUND

1. Field

The disclosure relates to a method and device for transmitting and receiving a signal in a multimedia system, and particularly to a method and device for transmitting and receiving a complex multimedia signal in a multimedia system.

2. Description of the Related Art

As the demand for multimedia content increases, various multimedia schemes have been proposed. A representative multimedia scheme among them is a moving picture experts group (MPEG) media transport (MMT) scheme.

The MMT scheme is a technology for transporting and delivering coded media data associated with multimedia services via a heterogeneous packet-switched network including Internet protocol (IP) networks and digital broadcasting networks. Here, the coded media data includes timed audiovisual media data and non-timed data.

Also, the MMT scheme has been proposed to efficiently and effectively deliver media data. Particularly, regarding the MMT scheme, various schemes for transmitting and receiving complex multimedia data including various types of multimedia data and multimedia services have been proposed.

Meanwhile, the aforementioned information is disclosed only as background information for helping in understanding the disclosure. No decision and no opinion on whether any of the above content can be applied as the prior art of the disclosure have been made yet.

According to an aspect of the disclosure, a method and device for transmitting and receiving a signal in a multimedia system are provided.

According to an aspect of the disclosure, a method and device for transmitting and receiving a complex multimedia signal in a multimedia system are provided.

According to an aspect of the disclosure, when a multimedia system supports different types of data for the same content, a method and device for supporting an operation associated with a case where the type of data being reproduced is changed are provided.

According to an aspect of the disclosure, a method and device for transmitting and receiving information associated with a change of subtitles in a multimedia system are provided.

According to an aspect of the disclosure, a method and device for supporting subtitles based on multiple languages in a multimedia system are provided.

According to an aspect of the disclosure, a method and device for supporting an operation associated with a change of subtitles in a multimedia system are provided.

According to an aspect of the disclosure, a method and device for improving a user experience associated with a change of subtitles in a multimedia system are provided.

In accordance with an aspect of the disclosure, a method of a transmission device in a multimedia system is provided. The method includes: detecting a request to change from first-type data to second-type data while the first-type data is reproduced at a given point in time; and transmitting information required for replaying at least one of data reproduced before the given point in time among the first-type data and data reproduced before the given point in time among the second-type data, before the second-type data is reproduced.

In accordance with another aspect of the disclosure, a method of a reception device in a multimedia system is provided. The method includes: detecting a request to change from first-type data to second-type data while the first-type data is reproduced at a given point in time; and receiving information required for replaying at least one of data reproduced before the given point in time among the first-type data and data reproduced before the given point in time among the second-type data, before the second-type data is reproduced.

In accordance with an aspect of the disclosure, a transmission device in a multimedia system is provided. The transmission device includes: a controller configured to detect a request to change from first-type data to second-type data while the first-type data is reproduced at a given point in time; and a transmission unit configured to transmit information required for replaying at least one of data reproduced before the given point in time among the first-type data and data reproduced before the given point in time among the second-type data, before the second-type data is reproduced.

In accordance with another aspect of the disclosure, a reception device in a multimedia system is provided. The reception device includes: a controller configured to detect a request to change from first-type data to second-type data while the first-type data is reproduced at a given point in time; and a reception unit configured to receive information required for replaying at least one of data reproduced before the given point in time among the first-type data and data reproduced before the given point in time among the second-type data, before the second-type data is reproduced.

According to an embodiment, a signal can be transmitted and received in a multimedia system.

According to an embodiment, a complex multimedia signal can be transmitted and received in a multimedia system.

According to an embodiment, in the case in which an MMT system provides a multimedia streaming service including subtitle data of one or more languages, deterioration in a user experience, which may occur when a subtitle language is changed and the lengths of subtitles are different from each other, can be alleviated.

According to an embodiment, in the case in which different types of data for the same content are supported in a multimedia system, an operation performed when the type of data being reproduced is changed can be supported.

According to an embodiment, information associated with a change of subtitles can be transmitted and received in a multimedia system.

According to an embodiment, subtitles based on multiple languages can be supported in a multimedia system.

According to an embodiment, an operation associated with a change of subtitles in a multimedia system can be supported.

According to an embodiment, a user experience associated with a change of subtitles in a multimedia system can be improved.

BRIEF DESCRIPTION OF DRAWINGS

The above and other aspects, features, and advantages, according to specific exemplary embodiments of the disclosure, will be more apparent from the following detailed descriptions taken in conjunction with the accompanying drawings, in which.

It should be noted that similar reference numerals are used to indicate identical or similar elements, features, and structures through the above figures.

DETAILED DESCRIPTION

Figure 1:
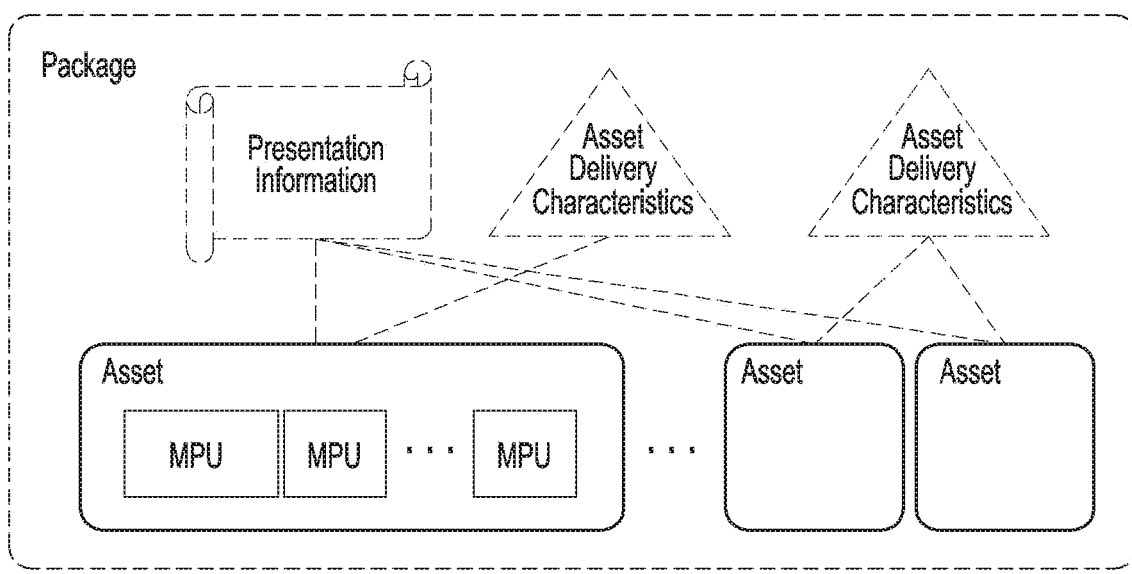
FIG. 1 is a diagram schematically illustrating an MMT data model of an MMT system according to an embodiment.

The following detailed described that refers to the accompanying drawings help in comprehensively understanding various embodiments of the disclosure defined by the claims and the equivalents thereof. Although the following detailed description includes various specific concrete explanations to assist with understanding, they are considered to be only examples. Accordingly, those skilled in the art may recognize that various modifications and changes of the various embodiments described herein can be made without departing from the range and scope of the disclosure. Further, descriptions of the known functions and elements can be omitted for clarity and brevity.

The terms and words used in the following detailed description and the claims are not limited to literal meanings, and are simply used for helping obtain a clear and consistent understanding of the disclosure. Therefore, it should be apparent to those skilled in the art that the following description of various embodiments of the disclosure is provided for illustrative purposes only and is not intended to limit the disclosure that is defined by the appended claims and equivalents thereof.

Further, it will be appreciated that singular expressions such as "an" and "the" include plural expressions as well, unless the context clearly indicates otherwise. Accordingly, as an example, a "component surface" includes one or more component surfaces.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the disclosure. As used herein, the term "and/or" includes any and all combinations of one or more associated items.

The terms used herein are used only to describe particular embodiments, and are not intended to limit the disclosure. As used herein, the singular forms are intended to include the plural forms as well, unless the context clearly indicates otherwise. In the disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as commonly understood by those of skill in the art to which the disclosure pertains. Such terms as those defined in a generally used dictionary are to be interpreted to have the meaning equal to the contextual meaning in the relevant field of art.

According to various embodiments of the disclosure, an electronic device may include a communication functionality. The terminal may, for example, be a smart phone, a tablet Personal Computer (PC), a mobile phone, a video phone, an e-book reader, a desktop PC, a laptop PC, a netbook PC, a personal digital assistant (PDA), a Portable Multimedia Player (PMP), an MP3 player, a mobile medical device, a camera, or a wearable device (e.g., Head-Mounted Device (HMD), electronic clothes, an electronic bracelet, an electronic necklace, an electronic appcessory, an electronic tattoo, or a smart watch).

According to various embodiments of the disclosure, the electronic device may be a smart home appliance with a communication functionality. The smart home appliance may, for example, be a television, a Digital Video Disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the disclosure, the terminal may be a medical appliance (e.g., Magnetic Resonance Angiography (MRA) device, Magnetic Resonance Imaging (MRI) device, Computed Tomography (CT) device, and ultrasonic device), a navigation device, a Global Positioning System (GPS) receiver, an Event Data Recorder (EDR), a Flight Data Recorder (FDR), an automotive infotainment device, a marine electronic device (e.g., ship navigation device and a gyrocompass), avionics, security equipment, or an industrial or home robot.

According to various embodiments of the disclosure, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the disclosure, the electronic device may be a combination of the above-mentioned devices. Further, it will be apparent to those skilled in the art that the terminal according to various embodiments of the disclosure is not limited to the above-mentioned devices.

According to various embodiments, each of a transmission device and a reception device may be, for example, an electronic device. According to various embodiments, the transmission device may be referred to as a transmission entity, and the reception device may be referred to as a reception entity.

Also, according to various embodiments, the transmission device may be a service provider or a terminal.

Also, according to various embodiments, the reception device may be a terminal or a service provider.

Also, according to various embodiments, the term "terminal" may be interchangeable with terms, such as a mobile station (MS, hereinafter referred to as a MS), a wireless terminal, a mobile device, a user equipment (UE, hereinafter referred to as a UE), and the like. Also, according to various embodiments, the term "service provider" may be interchangeable with terms such as "broadcasting server" and the like.

According to an aspect of the disclosure, a method and device for transmitting and receiving a signal in a multimedia system are provided.

According to an aspect of the disclosure, a method and device for transmitting and receiving a complex multimedia signal in a multimedia system are provided.

According to an aspect of the disclosure, when a multimedia system supports different types of data for the same content, a method and device for supporting an operation associated with the case in which the type of data being reproduced is changed are provided.

According to an aspect of the disclosure, a method and device for transmitting and receiving information associated with a change of subtitles in a multimedia system are provided.

According to an aspect of the disclosure, a method and device for supporting subtitles based on multiple languages in a multimedia system are provided.

According to an aspect of the disclosure, a method and device for supporting an operation associated with a change of subtitles in a multimedia system are provided.

According to an aspect of the disclosure, a method and device for improving a user experience associated with a change of subtitles in a multimedia system are provided.

A method and device proposed in an embodiment may be applicable to various communication systems, for example, a digital video broadcasting system such as an Internet protocol television (IPTV, hereinafter referred to as "IPTV") service and a mobile broadcasting service such as a digital multimedia broadcasting (DMB, hereinafter referred to as "DMB") service, a digital video broadcasting-handheld (DVB-H, hereinafter referred to as "DVB-H") service, an advanced television systems committee-mobile/handheld (ATSC-M/H, hereinafter referred to as "ATSC-M/H") service, a moving picture experts group (MPEG) media transport (MMT, hereinafter referred to as "MMT") system, an evolved packet system (EPS, hereinafter referred to as "EPS"), a long-term evolution (LTE, hereinafter referred to as "LTE") mobile communication system, a long-term evolution-advanced (LTE-A, hereinafter referred to as "LTE-A") mobile communication system, a high-speed downlink packet access (HSDPA, hereinafter referred to as "HSDPA") mobile communication system, a high-speed uplink packet access (HSUPA, hereinafter referred to as "HSUPA") mobile communication system, a high rate packet data (HRPD, referred to as "HRPD") mobile communication system of a $3^{rd}$-generation partnership project 2 (3GPP2, hereinafter referred to as "3GPP2"), a wideband code division multiple access (WCDMA, hereinafter referred to as "WCDMA") mobile communication system of 3GPP2, a code division multiple access (CDMA, hereinafter referred to as "CDMA") mobile communication system of 3GPP2, an institute of electrical and electronics engineers (IEEE, hereinafter referred to as "IEEE") 802.16m communication system, a mobile internet protocol (Mobile IP, hereinafter referred to as "Mobile IP") system, and the like.

Also, a method and device proposed in an embodiment may be applicable to an advanced television systems committee (ATSC, hereinafter referred to as "ATSC") system based on an MMT scheme.

Hereinafter, for ease of description, in various embodiments, it is assumed that the multimedia system is a multimedia system based on an MMT scheme.

First, terms used in various embodiments will be described as follows.

First, multimedia data will be described.

The multimedia data may include one or more media components. The media components may be, for example, video files, audio files, subtitles, and the like. Here, the subtitles may include captions, which are text data obtained by converting the content of audio data into text data to help a user who has difficulty hearing, subtitles which express the corresponding content, for example, a dialogue between persons in a movie or the like, as text of a language, which may be the same as or different from the language of the corresponding content, and the like. For example, for a movie produced in English, various types of subtitle data may be generated, such as English subtitles, Korean subtitles, Japanese subtitles, English captions, and the like.

Second, data streaming will be described.

Multimedia data may be transmitted from a transmission device to a reception device via a network such as a mobile communication network or the like, and upon the transmission, the multimedia data may be reproduced by the reception device via a series of processing processes, which is multimedia streaming. The multimedia data is fragmented in units defined according to a transport protocol and a transport format used for transmission, and the fragmented units are transmitted. When a single piece of multimedia data is transmitted, media components included in the multimedia data and metadata which describes the relationship among the media components are transmitted together according to regulations defined in the transport protocol and the transport format. Therefore, even though the reception device does not yet receive the entirety of the multimedia data, the reception device may reproduce a part of the multimedia data, of which transmission is completed, on the basis of the metadata.

For example, when the multimedia data includes subtitle data produced in one or more languages, for example, multiple languages, the length of subtitle data may differ depending on the linguistic characteristics of the corresponding language even though the language describes the same content. In this instance, the time at which the corresponding part, that is, the corresponding subtitle data, is to be reproduced is also different. For example, when a subtitle language for a scene is Korean, the length of subtitle data may be 30 words. When the subtitle language is English, the length of subtitle data may be 20 words. Accordingly, the length of subtitle data is different for each subtitle language, and the presentation start time, presentation end time, and presentation duration of the subtitle data are also different. Here, the presentation start time may be also expressed as "presentation begin time" or "presentation start time".

Therefore, while multimedia data including subtitle data produced in one or more languages, for example, multiple languages, is reproduced, when a predetermined event, such as selection by a user of a terminal or another cause, occurs, and the subtitle language, that is, the language of the subtitle data, is changed from a first language to a second language, the subtitle data may be abnormally reproduced since the length of subtitle data is different. Hereinafter, for ease of description, a subtitle written in a first language is referred to as a "first subtitle", and a subtitle written in a second language is referred to as a "second subtitle".

In the state in which a first subtitle, which is presented for a scene, for example, a first scene, is changed to a second subtitle, if the presentation of the second subtitle for the first scene is finished earlier than the presentation of the first subtitle, a user of a terminal may not completely read any of the first subtitle and the second subtitle, but may wait until a second subtitle for a second scene subsequent to the first scene is presented.

This may be a factor that deteriorates a user experience in a multimedia data streaming service including subtitle data produced in multiple languages.

Therefore, in the case in which a multimedia streaming service including subtitle data produced in one or more languages, for example, multiple languages, is provided in a multimedia system, an embodiment of the disclosure provides a method and device for reducing the deterioration in user experience caused by a change in the length of subtitles when the language used for generating subtitle data, that is, the subtitle language, is changed.

First, terms used in an embodiment will be described as follows.

First, an MMT data model in an MMT system according to an embodiment will be described with reference to FIG. 1.

FIG. 1 is a diagram schematically illustrating an MMT data model of an MMT system according to an embodiment.

Referring to FIG. 1, in the MMT system, a single set of logical media data is referred to as a package. The MMT package may include one or more assets corresponding to a set of media data, presentation information describing the temporal and spatial relationship between the assets, quality of service (QoS) information required for transmitting the assets, or asset delivery characteristics including delivery-related information.

Also, an asset is a set of media data included in a single multimedia presentation, and an asset may include one or more media-processing units (MPU) having the same asset identifier (ID). Each of the MPU included in a single asset may include fragments of the asset, which do not overlap each other. That is, two successive and different MPUs do not include the same media sample.

Also, an MPU indicates a unit of media data that may be consumed independently in a presentation engine of an MMT reception device.

The process in which a single MMT device processes a single MPU may include encapsulation or de-capsulation of media data in units of MPUs and packetization or de-packetization.

Also, a single MPU may be fragmented in units of MPU fragments. Accordingly, one MPU may be fragmented into one or more MPU fragments. Here, an MPU fragment may be, for example, a media fragment unit (MFU).

Also, a single MPU may be fragmented in units of data units for packetization. Therefore, a single MPU may be fragmented into one or more data units.

A single MPU may be specified by a single asset ID corresponding to the data included in the MPU and a single MPU sequence number. For example, two different MPUs included in a single asset may have the same asset ID, but different MPU sequence numbers from each other.

Also, media data included in an MPU may include timed media data which is related to time and non-timed media data which is irrelevant to time. When the media data includes timed media data, presentation information that explains the relationship among different assets of one package on the time axis needs to be provided together with the timed media data. For all MPUs, presentation time information may be provided as a part of the presentation information, which will be described with reference to FIG. 2 as below.

Figure 2:
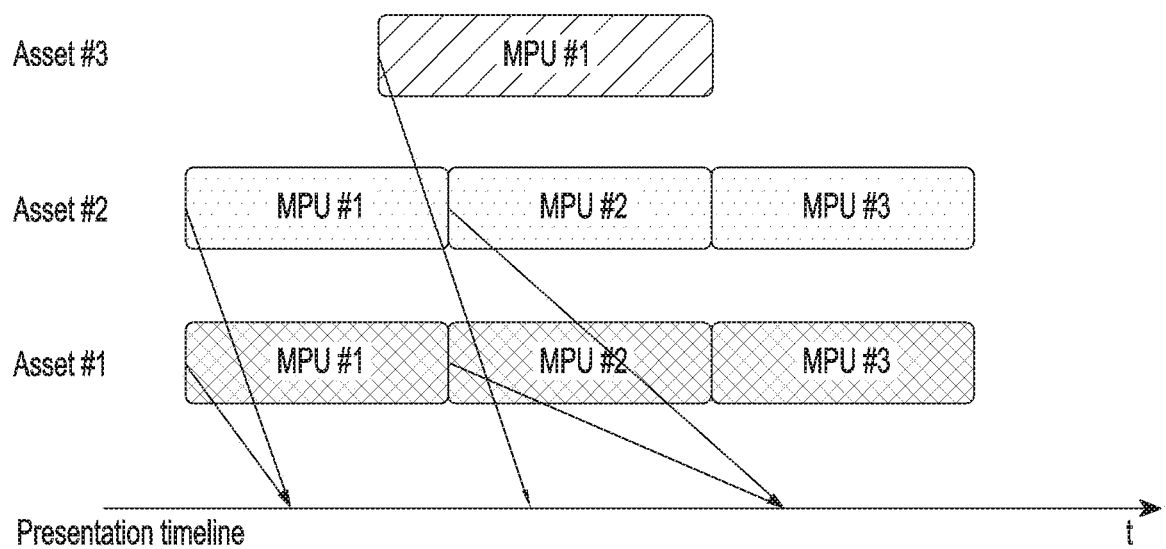
FIG. 2 is a diagram schematically illustrating an example of mapping between a presentation timeline and MPUs in an MMT system according to an embodiment.

FIG. 2 is a diagram schematically illustrating an example of mapping between a presentation timeline and MPUs in an MMT system according to an embodiment.

Referring to FIG. 2, the mapping relationship between assets and MPUs is illustrated. For example, MPU #1, MPU #2, and MPU #3 are mapped to asset #1, MPU #1, MPU #2, and MPU #3 are mapped to asset #2, and MPU #1 is mapped to asset #3.

Second, an MPU based on an ISO Base Media File Format of an MMT system according to an embodiment will be described.

First, ISO Base Media File Format (ISO BMFF) indicates the ISO/IEC 14496-12 standard. A single MPU may need to be compatible with an ISOBMFF file. The MPU sequence number and asset ID of an MPU is provided from an 'mmpu' box, and the MPU sequence number and the asset ID may be elements to specify a corresponding MPU, among MPUs encapsulated in a file, as a unique MPU.

Also, in the case of timed media, a single "sidx" box may exist, which is an index of movie fragments of an MPU. A "moov" box needs to contain all codex configuration information required for decoding and reproducing media data.

Also, timed media is stored as a track of ISOBMFF. Here, a single media track is allowed for the timed media data. Also, non-timed media is stored as a part of metadata of ISOBMFF.

An example of MMT encapsulation in an MMT system according to an embodiment will be described with reference to FIG. 3.

Figure 3:
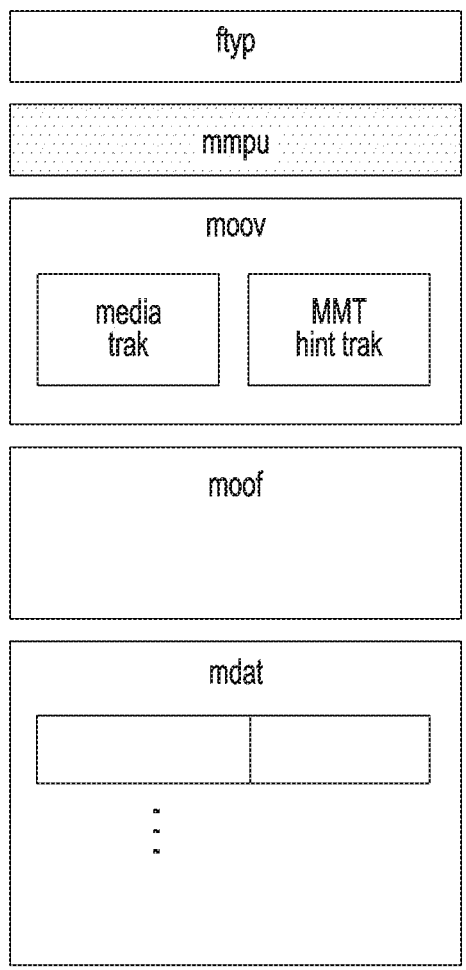
FIG. 3 is a diagram schematically illustrating an example of MMT encapsulation in an MMT system according to an embodiment.
Figure 3:
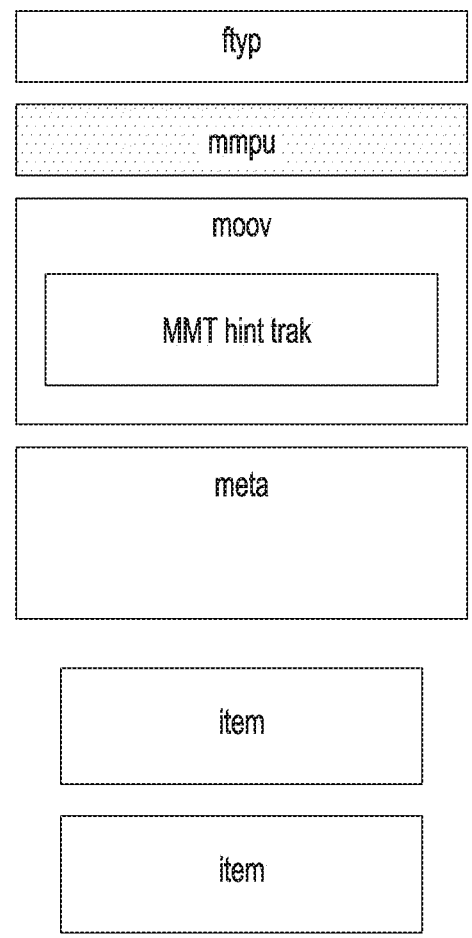

FIG. 3 is a diagram schematically illustrating an example of MMT encapsulation in an MMT system according to an embodiment.

Referring to FIG. 3, timed media and non-timed media are illustrated. To perform MPU packet transmission, a single MMT hint track provides information required for converting an encapsulated MPU into an MMT protocol (MMTP) payload and an MMTP packet.

Third, the configuration of multimedia data in an MMT system according to an embodiment will be described.

First, when a piece of multimedia content is provided to a terminal, the multimedia content may include video data, audio data, and subtitle data. Particularly, subtitles may be provided as a plurality of pieces of subtitle data based on multiple languages. For example, media components included in a piece of multimedia data may include a single piece of video data, a single piece of audio data, and two pieces of subtitle data. The two pieces of subtitle data may include English subtitle data and Korean subtitle data.

Each media component may be stored in the form of a track defined in ISO Base Media File Format (ISO/IEC 14496-12), and the track may be defined as an asset in an MMT system.

Therefore, the multimedia data including the video data, audio data, English subtitle data, and Korean subtitle data may be produced as a video asset, an audio asset, an English subtitle asset, and a Korean subtitle asset in the MMT system, and each asset may be fragmented into one or more MPUs.

In the case of a subtitle asset, on the assumption that a set of subtitle data expressed in one scene is a subtitle paragraph (hereinafter referred to as a "paragraph" for ease of description), data corresponding to a single paragraph may be included in one MPU.

Fourth, signaling information in an MMT system according to an embodiment will be described.

In the MMT system, a transmission device and a reception device may perform transmission and reception of signaling information required for MMT packet delivery and MMT packet consumption.

The MMT signaling information is transmitted in the form of an MMT signaling message, and the common format of MMT signaling messages may be expressed as shown in Table 1 below.

TABLE 1

| Syntax | Value | No. of bits | Mnemonic |
|---|---|---|---|
| signalling_message ( ) { | | | |
|   message_id | | 16 | uimsbf |
|   version | | 8 | uimsbf |
|   if(message_id != PA_message && message_id != MPI_message) { | | | |
|     length | | | |
| | | 16 | uimsbf |
|   } else { | | | |
|     length | | | |
| | | 32 | uimsbf |
|   } | | | |
|   extension | | | |
|   message_payload { | | | |
|     } | | | |
| } | | | |

Table 1 indicates the syntax of the normal format of MMT signaling messages, and the semantics of parameters included in Table 1 may be expressed as shown in Table 2.

TABLE 2 message_id—this field indicates the identifier of the signalling message. Valid message identifier values are listed in Table 61.
version—this field indicates the version of the signalling message. Both MMT sending entity and MMT receiving entity can verify whether a received message has a new version of not.
length—this field indicates the length of the signalling message. This field for all signalling message except PA messages and MPI message is 2 bytes long. The length of PA messages and MPI messages is 4 bytes long because it is expected that occasionally an MPI table whose length cannot be expressed by a 2 bytes length fields. Also note that a PA message includes at least one MPI table.
extension—this field provides extension information for signalling messages that require extension. The content and length of this field are specified for these signalling messages.
message_payload—the payload of the signalling message. The format of this field can be identified by the value of the message_id field.

In Table 2, Table 61 indicates Table 34 of ISO/IEC 23008-1:2014(E) 1$^{st}$ Edition.

In Table 2, the message_id field indicates the identifier of the signaling message. Valid message identifier values are listed in Table 34 of ISO/IEC 23008-1:2014(E) 1$^{st}$ Edition, and the field values of the message_id field may have the following meaning.

If the field value of the message_id field is, for example, 0x0000, this indicates a package access (PA) message. If the field value of the message_id field is, for example, any one value in the range of 0x0001 to 0x000F, this indicates a media presentation information (MPI) message. For a package, 16 adjacent values are allocated to MPI messages. If (the field value of the message_id field) % 16 is equal to 15, the MPI message delivers complete presentation information (PI). If (the field value of the message_id field) % 16 is equal to N, the MPI message delivers a subset (subset-N) MPI. Here, N is a value in the range of 0 to 14.

Also, if the field value of the message_id field is, for example, any one value in the range of 0x0010 to 0x001F, this indicates an MMT package table (MPT) message. For a package, 16 adjacent values are allocated to MPT messages. If (the field value of the message_id field) % 16 is equal to 15, the MPT message delivers a complete MPT. If (the field value of the message_id field) % 16 is equal to N, the MPT message delivers a subset (subset-N) MPT. Here, N is a value in the range of 0 to 14.

Also, if the field value of the message_id field is, for example, 0x0200, this indicates clock relation information (CRI) messages. If the field value of the message_id field is, for example, 0x0201, this indicates device capability information (DCI) messages. If the field value of the message_id field is, for example, 0x0202, this indicates application layer forward error correction (AL-FEC) messages. If the field value of the message_id field is, for example, 0x0203, this indicates hypothetical receiver buffer model (HRBM) messages. If the field value of the message_id field is, for example, any one value in the range of 0x0204 to 0x7FFF, this indicates reservation for the purpose of the International Organization for Standardization (ISO). If the field value of the message_id field is, for example, any one value in the range of 0x8000 to 0xFFFF, this indicates reservation for private purposes.

In Table 2, the version field indicates the version of the signaling message. Both an MMT transmission entity and an MMT reception entity may verify whether or not a received message has a new version.

In Table 2, the length field indicates the length of the signaling message. The lengths of signaling messages, excluding a PA message and an MPI message, may be, for example, 2 bytes. The lengths of the PA message and the MPI message may be 4 bytes, since it is occasionally impossible to express the length of an MPI table in a length field of 2 bytes. Here, it should be understood that the PA message includes at least one MPI table.

In Table 2, the extension field includes extension information for signaling messages that require extension. The content and length of the extension field may be specified for each corresponding signaling message.

In Table 2, the message_payload field includes the payload of the signaling message. The format of the message_payload field may be identified by the value of the message_id field. Fifth, an MMT package (MP) table in an MMT system according to an embodiment will be described.

Information required for transmitting and consuming an MMT package may be stored in the form of a table for each role, and the required tables may be transmitted from an MMT transmission device to an MMT reception device via an MMT signaling message.

The list of all assets included in a single MMT package is stored in an MP table, and may be transmitted via a package access (PA) message. The MP table may include time-related information of all assets included in the MMT package, the location of data, and related descriptors required for consuming assets.

Here, the MP table may be expressed as shown in Table 3. The MP table may be implemented as a complete MP table or a subset MP table. The complete MP table may include information related to the package including all assets, and the subset MP table may include a part of information stored in the complete MP table. Also, MP table subset-0 may include the minimum information required for consuming the package.

Table 3 indicates the syntax of the MP table, and the semantics of parameters included in Table 3 may be expressed as shown in Table 4.

TABLE 4 table_id—indicates the identifier of the MP table. A complete MP table and each subset MP tables shall use different table identifiers. Subset number of MP table is implicitly represented by this field. Since the table_id values are assigned contiguously, the MP table subset number can be deduced from this field, i.e., the MP table subset number equals this field minus the table_id of the base MP table. The MP table subset number provides the subset number of this MP table. The number '0' indicates base MP table and the numbers '1'~'14' indicate subset of MP table. The number '15' has a special meaning since it indicates a complete MP table.

version—indicates the version of the MP table. The newer version overrides the older one as soon as it is been received. If table_id

TABLE 3

| Syntax | Value | No. of bits | Mnemonic |
|---|---|---|---|
| MP_table( ) { | | | |
|   table_id | | 8 | uimsbf |
|   version | | 8 | uimsbf |
|   length | | 16 | uimsbf |
|   reserved | '11 1111' | 6 | bslbf |
|   MP_table _mode | | 2 | bslbf |
|   if ((table_id == 0x10) or (table_id == 0x11)) | | | |
|   {MMT_package_id { | N1 | | |
|     MMT_package_id_length | | 8 | uimsbf |
|     for (i=0; i<N1; i++) [ | | | |
|       MMT_package_id_byte | | 8 | uimsbf |
|     } | | | |
|   } | | | |
| } | | | |
|   MP_table_descriptors { | N2 | | |
|     MP_table_descriptors_length | | 16 | uimsbf |
|     for (i=0; 1<N2: 1++) { | | | |
|       MP_table_descriptors_byte | | 8 | uimsbf |
|     } | | | |
|   } | | | |
| } | | | |
| number_of_assets | N3 | 8 | uimsbf |
| for (i=0; i<N3; i++) { | | | |
|   Identifier_mapping( ) | | | |
|   asset_type | | 32 | char |
|   reserved | '1111 11' | | bslbf |
|   default_asset_flag | | | bslbf |
|   asset_clock_relation_flag | | 1 | bslbf |
|   if (asset_clock_relation_flag == 1) { | | | |
|     asset_clock_relation_id | | 8 | uimsbf |
|     reserved | '1111 111' | 7 | bslbf |
|     asset_timescale_flag | | 1 | bslbf |
|     if (asset_time_scale_flag == 1) { | | | |
|       asset_timescale | | 32 | uimsbf |
|     } | | | |
|   } | | | |
|   asset_location [ | | | |
|   location_count | N4 | 8 | uimsbf |
|     for (i=0; i<N4; i++) { | | | |
|       MMT_general_location_info( ) | | | |
|     } | | | |
|   } | | | |
|   asset_descriptors { | N5 | 16 | uimsbf |
|     asset_descriptors_length | | | |
|     for (j=0; j<N5; j++) { | | 8 | uimsbf |
|       asset_descriptors_byte | | | |
|     } | | | |
|   ] | | | |
| } | | | |
| ] | | | |

TABLE 4-continued indicates a complete MP table, if Subset-0 MP table has the same version value as this field (when MP_table_mode is '1'), or if all MP table subsets with lower-subset number have the same version value as this field (when MP_table_mode is '0'), or if processing of the MP table subsets are independent (when MP_table_mode is '2'). If Subset-0 MP table has a newer version, all MP table subsets with higher subset number up to 14 previously stored within an MMT receiving entity are treated as outdated except for the case when MP_table_mode is independent mode. When the MP table subset number is not 0 and MP_table_mode is '1', the contents of the MP table subset with version different from that of subset-0 MP table stored in an MMT receiving entity shall be ignored. Also when the MP table subset number is not 0 and MP_table_mode is '0', the contents of the MP table subset with version different from that of lower-subset MP table subsets stored in an MMT receiving entity shall be ignored. It shall be modulo-256 incremented per version change.

length—contains the length of the MP talbe in bytes, counting from the beginning of next field to the last byte of the MP table. The value '0' is not valid for this field.

MP_table_mode—It indicates the mode of an MP table subset processing when MP table subset mechanism is used. In "sequential order_processing_mode" and with a non-zero subset number of this MP table, an MMT receiving entity shall receive all MP table subsets with lower subset number that have the same version as this MP table subset before it processes this MP table subset. For example, an MMT receiving entity can't process subset-3 MP table, if it has not received subset-2 MP table with the same version. In "order_irrelevant_processing_mode" and with the subset number of this MP table subset set to non-zero, an MMT receiving entity should process an MP table subset right after it receives the MP table subset as long as the subset-0 MP table stored in an MMT receiving entity has the same version as this MP table subset. In "independent_processing_mode", the version of each MP table subset is managed individually. Fragmented MP table where each MP table subset is delivered by one of multiple MMT sending entities is adapted in this mode. The independent mode of subsets of MP table can be used for the multi-channel instantiation, i.e. MP table subsets from subset-0 MP table to subset-N MP table are assigned as logical channels from Ch-0 to Ch-N. When an MPI message carries both an MPI table subset and the associated MP table subset, the PI_mode in the MPI table and the MP_table_mode in the MP table shall have the same value.

In Table 4, the table_id field indicates the identifier of the MP table. The complete MP table and each subset MP table may use different table identifiers. An MP table subset number may be implicitly represented by the table_id field. Since the table_id values are assigned contiguously, the MP table subset number may be deduced from the table_id field. That is, the MP table subset number is equal to a value obtained by subtracting the field value of the table_id field of a base MP table from the field value of the table_id field. The MP table subset number provides the subset number of a corresponding MP table. The number "0" indicates a base MP table. The numbers "1" to "14" indicate MP table subsets. The number "15" has a special meaning since it indicates a complete MP table.

In Table 4, the version field indicates the version of the MP table. Upon reception of the version field, a newer version immediately overrides an old version. If the table_id field indicates a complete MP table, if a subset-0 MP table has the same version value as the version field (when the field value of the MP_table_mode field is "1"), if all MP table subsets having lower subset numbers have the same version value as the version field (when the field value of the MP_table_mode field is "0"), or if processing of the MP table subsets is independent (when the field value of the MP_table_mode field is "2"), if the subset-0 MP table has a newer version, all MP table subsets with higher subset numbers up to 14, which are stored in advance in the MMT reception entity, are considered outdated, except for the case in which the MP_table_mode is an independent mode. When the MP table subset number is not 0 and the MP_table_mode is "1", the content of the MP table subset with a version different from that of the subset-0 MP table stored in the MMT reception entity may be disregarded. When the MP table subset number is not 0 and the MP_table_mode is "0", the content of the MP table subset with a version different from those of lower-subset MP table subsets stored in the MMT reception entity may be disregarded. The field value of the version field may be increased by modulo-256 every time that a version is changed.

In Table 4, the length field indicates the length of the MP table in bytes, and bytes from the start of a next field to the last byte of the MP table are counted. The value "0" is invalid for the length field.

In Table 4, the MP_table_mode field indicates the mode of an MP table processing when an MP table subset mechanism is used. In a "sequential_order_processing_mode", using a nonzero subset number of the corresponding MP table, an MMT reception entity may receive all MP table subsets that have lower subset numbers and have the same version as that of the corresponding MP table subset before the MMT reception entity processes the corresponding MP table subset. For example, if the MMT reception entity does not receive a subset-2 MP table having the same version, the MMT reception entity is incapable of processing a subset-3 MP table. In "order_irrelevant_processing_mode", using the subset number of the corresponding MP table subset, which is set to a nonzero value, the MMT reception entity may need to process the MP table subset immediately after receiving the MP table subset, as far as the subset-0 MP table stored in the MMT reception entity has the same version as that of the corresponding MP table subset. In "independent_processing_mode", the version of each MP table subset is managed individually. A fragmented MP table in which each MP table subset is delivered by one of a plurality of MMT transmission entities is adapted in the "independent_processing_mode". The independent mode of subsets of the MP table may be used for multi-channel instantiation. That is, the MP table subsets from subset-0 MP table to subset-N MP table are assigned as logical channels from channel-0 (Ch-0) to channel N (Ch-N). When an MPI message delivers both an MPI table subset and an associated MP table subset, the PI mode in the MPI table and the MP_table_mode in the MP table may have the same value.

Also, the MP_table_mode of Table 3 has the meanings according to the values shown in Table 5.

TABLE 5

| Value | Description |
| --- | --- |
| 00 | "sequential_order_processing_mode" |
| 01 | "order_irelevant_processing_mode" |
| 10 | "independent_processing_mode" |
| 11 | Reserved |

Also, each parameter included in Table 3 has the meaning shown in Table 6.

TABLE 6

MMT_package_id—this field is a unique identifier of the Package.
MMT_package_id_length—the length in bytes of the MMT_package_id string, excluding the terminating null character.
MMT_package_id_byte—a byte in the MMT_package_id. When the MMT_package_id_byte is string, the terminating null character is not included in the string.
asset_id—provides Asset identifier as defined in 9.6.2.

TABLE 6-continued asset_type—provides the type of Asset. This is described in four
character code ("4CC") type registered in MP4REG
(http://www.mp4ra.org).
MP_table_descriptors—this field provides descriptors for the MP table.
MP_table_descriptors_length—contains the length of the descriptor
syntax loop. The length is counted from the next field to the end of the
descriptor syntax loop. Several descriptors can be inserted in this syntax
loop. For example, additional_package_information_URL descriptor
can be included here, which provides the URL of Package information
web page for this Package.
MP_table_descriptors byte—one byte in the descriptors loop.
number_of_assets—provides the number of Assets whose information
is provided by this MP table.
packet_id—provides the identifier of the MMTP session in the MMTP
packet header.
asset_clock_relation_flag—indicates whether an Asset uses NTP clock
or other clock system as the clock reference. If this flag is '1',
asset_clock_relation_id field is included. If this field is '0', the NTP
clock is used for the Asset.
asset_clock_relation_id—provides a clock relation identifier for the
Asset. This field is used to reference the clock relation delivered by a
CRI_descriptor ( ) for the Asset. The value of this field is one of the
clock_relation_id values provided by the CRI descriptors. (see
sub-clause 9.5.1)
asset_timescale_flag—indicates whether "asset_timescale" information
is provided or not. If this flag is '1', asset_timescale field is included
and if this flag is set to '0', asset_timescale is 90,000 (90 KHz).
location_count—provides the number of location information for an
Asset. Set to '1' when an Asset is delivered through one location. When
bulk delivery is achieved, in which MPUs contained in an Asset are
delivered through multi-channels, not '1' is set. When one Asset is
delivered over multiple locations, an MMT receiving entity SHALL
receive all MPUs of the Asset from all indicated locations.
asset_timescale—provides information of time unit for all timestamps
used for the Asset expressed in the number of units in one second.
MMT_general_location_info_for_asset_location—provides the location
information of Asset. General location reference information for Asset
defined in 9.6.1 is used. Only the value of Location_type between
'0x00' and '0x06' shall be used for an Asset location.
asset_descriptors_length—the number of bytes counted from the
beginning of the next field to the end of the Asset descriptors syntax
loop.
asset_descriptors_byte—a byte in Asset descriptors.
default_asset_flag—indicates whether an Asset is marked as a default
asset or not. In case, an asset is marked as a default asset, the MPU
timestamp descriptor should be present for the corresponding timed
asset. If this flag is '0', the asset is marked as a default asset.

Also, in Table 6, sections, for example, sections 9.5.1, 9.6.1, and 9.6.2 indicate sections of the ISO/IEC 23008-1: 2014(E) 1$^{st}$ Edition standard.

In Table 6, the MMT_package_id field indicates the unique identifier of the corresponding package. The MMT_package_id_length field indicates the length of an MMT_package_id string, excluding a terminating null character, in bytes. The MMT_package_id_byte field indicates a byte of the MMT_package_id. When MMT_package_id_byte field is a string, the terminating null character is not included in the string. In Table 6, asset_id indicates an asset identifier as defined in the section 9.6.2 of the ISO/IEC 23008-1:2014(E) 1$^{st}$ Edition standard, and a detailed description thereof will be omitted. In Table 6, the asset_type field provides the type of the asset, and the asset_type field indicates a four character code (4CC) type registered with MP4REG (http://www.mp4ra.org).

In Table 6, the MP_table_descriptors field provides descriptors for the MP table, and the MP_table_descriptors_length field includes the length of a descriptor syntax loop. The length is counted from the next field to the last of the descriptor syntax loop. Some descriptors may be inserted into the corresponding syntax loop. For example, an additional_package information URL descriptor may be used, which may provide the URL of a package information webpage for the corresponding package.

In Table 6, the MP_table_descriptors_byte field may indicate one byte in the descriptors loop. The number_of_assets field provides the number of assets of which the information is provided by the corresponding MP table. The packet_id field provides the identifier of an MMTP session in an MMTP packet header. The asset_clock_relation_flag field indicates whether an asset uses a network time protocol (NTP) clock or another clock system as a clock reference. If the field value of the asset_clock_relation_flag field is "1", an asset_clock_relation_id field is included. If the field value of the asset_clock_relation_flag is "0", the NTP clock is used for the asset.

In Table 6, the asset_clock_relation_id field provides the clock relation identifier of the asset. The asset_clock_relation_id field is used to make reference to the clock relationship delivered by a CRI_descriptor( ) for the asset. The field value of the asset_clock_relation_id field is one of the clock_relation_id values provided by the CRI descriptors. Here, the CRI descriptor is described in section 9.5.1 of the ISO/IEC 23008-1:2014(E) 1$^{st}$ Edition standard, and a detailed description thereof will be omitted.

In Table 6, the asset_timescale_flag field indicates whether or not "asset_timescale" information is provided. If the field value of the asset_timescale_flag field is set to "1", asset_timescale information is included. If the field value of the asset_timescale_flag field is set to "0", asset_timescale information is 90,000 (90 kHz).

In Table 6, the location_count field provides the number of pieces of location information associated with an asset. When an asset is delivered via one location, the field value of the location_count field is set to "1". When bulk delivery is performed, in which MPUs included in an asset are delivered via multiple channels, the field value of the location_count field is not set to "1". When one asset is delivered via multiple locations, the MMT reception entity may receive all MPUs of the asset from all indicated locations.

In Table 6, the asset_timescale field provides time unit information for all timestamps used for the asset expressed as the number of units within one second.

In Table 6, the MMT_general_location_info_for_asset_location field provides location information of an asset. Here, general location reference information for an asset may be used, which is described in section 9.6.1 of the ISO/IEC 23008-1:2014(E) 1$^{st}$ Edition standard. The value of the location_type field, which is between '0x00' and '0x06', may be used for an asset location.

In Table 6, the asset_descriptors_length field indicates the number of bytes counted from the start of the next field to the end of the Asset descriptors syntax loop. The asset_descriptors_byte field indicates a byte in asset descriptors. The default_asset_flag field indicates whether an asset is marked as a default asset. If an asset is marked as a default asset, an MPU timestamp descriptor may exist for a corresponding timed asset. If the field value of the default_asset_flag field is "0", the asset may be marked as a default asset.

Also, asset_id will be described as follows.

First, an asset_id syntax element group may be used for providing an asset ID. If an "mmpu" box exists, the values in the asset_id syntax element group may be the same as the asset ID of the "mmpu" box. A description of allocation of an asset ID when the "mmpu" box does not exist will be omitted.

Here, the asset_id syntax may be as shown in Table 7.

TABLE 7

| Syntax | Value | No. of bits | Mnemonic |
|---|---|---|---|
| asset_id( ){ | | | |
|   asset_id_scheme | | 32 | uimsbf |
|   asset_id_length | N | 8 | uimsbf |
|   for (j=0; j<N; j++) { | | | |
|     asset_id_byte | | 8 | uimsbf |
|   } | | | |
| } | | | |

The meaning of each parameter included in Table 7 may be as shown in Table 8.

TABLE 8 asset_id_scheme—provides the Asset ID scheme as defined in 6.3.3.
asset_id_length—provides the length in bytes of the asset_id.
asset_id_byte—a byte in the asset_id.

Also, in Table 8, a section, for example, section 6.3.3, indicates a section of the ISO/IEC 23008-1:2014 $1^{st}$ Edition standard.

In Table 8, the asset_id_scheme field provides an asset ID scheme as defined in section 6.3.3 of the ISO/IEC 23008-1; 2014 $1^{st}$ Edition standard. The asset_id_length field indicates the length of the asset_id field in bytes, and the asset_id_byte field indicates a byte in the asset_id.

Also, identifier mapping will be described as follows.

First, an identifier mapping syntax group element provides mapping between a content identifier and an MMTP packet sub-flow, and the MMTP packet sub-flow is a subset of MMTP packets that share the same packet identifier packet_id. The content identifier may be provided in other forms, such as an asset ID, a URL, or a pattern.

Here, the syntax of Identifier_mapping( ) may be as shown in Table 9.

TABLE 9

| Syntax | Value | No. of bits | Mnemonic |
|---|---|---|---|
| Identifier_mapping ( ) { | | | |
|   identifier_type | | 8 | uimsbf |
|   if ( identifier_type == 0x00) { | | | |
|     asset_id( ) | | | |
|   } else if (identifies_type == 0x01) { | | | |
|     URL_count | N1 | 16 | uimsbf |
|     for(i=0;i<N1;i++) { | | | |
|       URL_length[i] | | | |
|       for(j=0;j<N2;j++){ | N2 | 16 | uimsbf |
|         URL_byte[i] | | | |
|       } | | | |
|     } | | 8 | uimsbf |
|   } else if (identifier_type == 0x02) { | | | |
|     regex_length | | | |
|     for(i=0;i<N3;i++){ | | | |
|       regex_byte | N3 | 16 | uimsbf |
|     } | | | |
|   } else if (identifies_type == 0x03) { | | 8 | uimsbf |
|     representation_id_length | | | |

TABLE 9-continued

| Syntax | Value | No. of bits | Mnemonic |
|---|---|---|---|
|     for (i=0;i<N4;i++) { | | | |
|       representation_id_byte | N4 | 16 | uimsbf |
|     } | | | |
|   } else { | | 8 | uimsbf |
|     private_length | | | |
|     for(i=0;i<N5;i++){ | | | |
|       private_byte | | | |
|     } | N5 | 16 | uimsbf |
|   } | | | |
| } | | 8 | uimsbf |

The meaning of each parameter included in Table 9 may be as shown in Table 10.

TABLE 10 identifier_type—provides the type of the identifier that is used for the mapping to the packet_id. The list of available identifier types is provided by Table 6. ( corresponding to Table 11 ) below.

In Table 10, "Table 6" indicates Table 11 provided below, and the identifier_type field provides the type of identifier used for the mapping to the packet_id field. The list of available identifier types is provided in Table 11 below.

In Table 10, the identifier types for identifier mapping may be as shown in Table 11 below.

TABLE 11

| Value | Description |
|---|---|
| 0x00 | The identifier of the content is provided as an Asset id as defined in section 9.6.2. |
| 0x01 | The identifier of the content is provided as a list of URLs that are related together and share the same packet_id mapping. An example are DASH segments of the same representation. |
| 0x02 | The identifier of the content is provided as RegEx string that is used to match one or more URLs that identify files with the same packet_id mapping. |
| 0x03 | The identifier of the content is provided as a DASH Representation@id as defined in 23009-1 to identify all DASH segments of the same representation. |
| 0x04~0xFF | This value range is reserved for private identifiers. |

Also, a section in Table 11, for example, section 9.6.2, indicates a section of the ISO/IEC 23008-1:2014(E) $1^{st}$ Edition standard. Therefore, detailed descriptions thereof will be omitted. Also, the meaning of each parameter included in Table 9 may be as shown in Table 12 below.

TABLE 12

URL_count—the URL is a list of URLs and this value indicates the number of URLs provided in this list.
URL_Length—the length in bytes of the following URL.
URL_byte—a byte of the URL that is formatted as an UTF-8 character string
regex_length—the identifier is provided as a regular expression that matches a set of URLs and this field indicates the length of the RegEx string.
regex_byte—a byte of the RegEx string that is provided as a UTF-8 string.
representation_id_length—the identifier is provided as a DASH Representation@id and this value indicates the length of the Representation@id string.

TABLE 12-continued representation_id_byte—a byte of the Representation@id string.
private_length—the identifier is provided as private data and this field provides the length of the private identifier in bytes.
private_byte—a byte of the private identifier In Table 12, the URL is the list of URLs. The field value of the URL_count field indicates the number of URLs provided in the list of URLs. In Table 12, the URL_length field indicates the length of the following URL in bytes. The URL_byte field indicates a byte of the URL, which is formatted as a UTF-8 character string. In the regex_length field, the identifier is provided as a regular expression that matches a set of URLs, and the regex_length field indicates the length of the RegEx string.

In Table 12, the regex_byte field indicates a byte of the RegEx string provided as a UTF-8 string. In the representation_id_length field, the identifier is provided as a DASH Representation@id. The field value of the representation_id_length field indicates the length of the DASH Representation@id string.

In Table 12, the representation_id_byte field indicates a byte of the Representation@id string. In the private_length field, the identifier is provided as private data. The private_length field provides the length of the private identifier in bytes, and the private_byte field indicates a byte of the private identifier.

Sixth, an MPU timestamp descriptor of an MMT system according to an embodiment will be described.

Presentation time information is transmitted for each MPU of each asset. The presentation time information may be included in an MP table that describes the characteristics of each asset. In the MMT system, the presentation start time of each MPU is described in an MPU timestamp descriptor, and the MPU timestamp descriptor is included in the MP table. Therefore, MPUs in each asset may be synchronized with each other on the presentation time axis.

The MPU timestamp descriptor may be as shown in Table 13 below. (This descriptor provides presentation time of the first AU of MPU in presentation order after application of any offset such as the one provided by 'elst' box. When presentation information presents this descriptor shall be ignored.)

TABLE 13

| Syntax | Value | No. of bits | Mnemonic |
| --- | --- | --- | --- |
| MPU_timestamp_descriptor ( ) { | | | |
|   descriptor_tag | | 16 | uimsbf |
|   descriptor_length | N*12 | 8 | uimsbf |
|   for (i=0; i<N; i++) { | | | |
|     mpu_sequence_number | | 32 | uimsbf |
|     mpu_presentation_time | | 64 | uimsbf |
|   } | | | |
| } | | | |

Here, the meaning of each parameter included in Table 13 may be as shown in Table 14 below.

TABLE 14 descriptor_tag—a tag value indicating the type of a descriptor.
descriptor_length—indicates the length in bytes counting from the next byte after this field to the last byte of the descriptor.
mpu_sequence_number—indicates the sequence number of the MPU presented at a time given the following mpu presentation time.

TABLE 14-continued mpu_presentation_time—indicates the presentation time of the first AU in the designated MPU by 64 bit NTP time stamp format.

In Table 14, the descriptor_tag field indicates a tag value indicating the type of a descriptor. The descriptor_length field indicates the length counted from a byte subsequent to the descriptor_length field to the last byte of the descriptor, in bytes. In Table 14, the mpu_sequence_number field indicates the sequence number of an MPU reproduced at a subsequent mpu_presentation_time. The mpu_presentation_time field indicates the presentation time of a first access unit (AU) in a designated MPU, on the basis of a 64-bit NTP timestamp format.

An example of the internal structure of an MMT transmission device in an MMT system according to an embodiment will be described with reference to FIG. 4.

Figure 4:
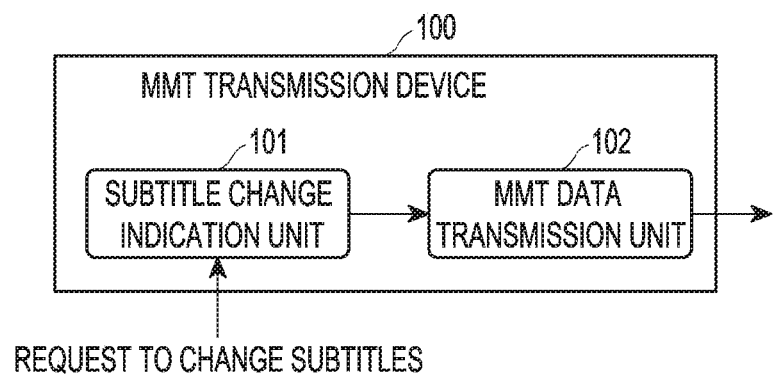
FIG. 4 is a diagram schematically illustrating an example of the internal structure of an MMT transmission device in an MMT system according to an embodiment.

FIG. 4 is a diagram schematically illustrating an example of the internal structure of an MMT transmission device in an MMT system according to an embodiment.

Referring to FIG. 4, the MMT transmission device 100 may include a subtitle change indication unit 101 and an MMT data transmission unit 102.

When a request to change from a currently transmitted first subtitle to a second subtitle is received from an MMT reception device or another device that communicates with the MMT transmission device 100, the subtitle change indication unit 101 may correct signaling information that describes MMT package and MMT data that are currently transmitted and may deliver information required for performing configuration to change subtitles (subtitle change configuration) to the MMT data transmission unit 102.

When the first subtitle and the second subtitle are included in different assets, an asset ID of a subtitle asset needs to be changed in an MP table, and an MPU timestamp descriptor including the presentation time information of each MPU, which is included in the asset to which the second subtitle belongs, needs to be transmitted.

In the case of changing the first subtitle to the second subtitle, a method of determining a transmission termination part of the first subtitle data and a transmission start part of the second subtitle data, and correcting related information to be suitable for a determined time, will be described in detail with reference to an operation of performing configuration to change subtitles. Detailed descriptions thereof will be omitted.

The information required for changing subtitles may be recorded in a subtitle change descriptor, and the subtitle change descriptor may be transmitted via an MMT signaling message. This will be described in subsequent descriptions related to a subtitle change descriptor, and a detailed descriptions thereof will be omitted here.

Also, the MMT data transmission unit 102 may transmit, to the MMT reception device, a subtitle change descriptor in which the information required for performing configuration to change subtitles is recorded, corrected signaling information, and MMT data, which are received from the subtle change indication unit 101.

FIG. 4 illustrates the case in which the MMT transmission device 100 is implemented as separate units, such as the subtitle change indication unit 101 and the MMT data transmission unit 102. However, the subtitle change indication unit 101 and the MMT data transmission unit 102 may be integrated into a single unit, and the subtitle change indication unit 101 and the MMT data transmission unit 102 may be implemented as at least one processor.

In FIG. 4, an example of the internal structure of the MMT transmission device in the MMT system has been described. Subsequently, an example of the internal structure of an MMT reception device in an MMT system according to an embodiment will be described with reference to FIG. 5.

Figure 5:
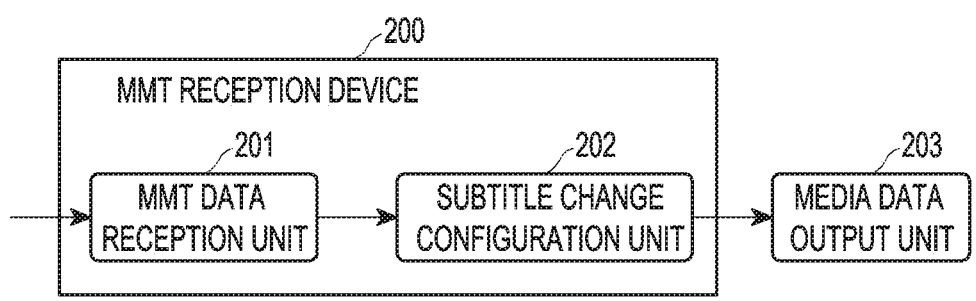
FIG. 5 is a diagram schematically illustrating an example of the internal structure of an MMT transmission device in an MMT system according to an embodiment.

FIG. 5 is a diagram schematically illustrating an example of the internal structure of an MMT reception device in an MMT system according to an embodiment.

Referring to FIG. 5, an MMT reception device 200 may include an MMT data reception unit 201, a subtitle change configuration unit 202, and a media data output unit 203.

The media data output unit 203 may physically exist inside the MMT reception device 200 or may exist outside the MMT reception device 200.

The MMT data reception unit 201 may receive MMT data transmitted from the MMT transmission device. The MMT data may include media data included in an MMT package, a signaling message, related data, and the like.

The subtitle change configuration unit 202 may generate information required for reproducing subtitle data and may transmit the same to the media data output unit 203 using a subtitle change descriptor transmitted from the MMT transmission device so that a first subtitle is presented until a determined time and a second subtitle is presented from the determined time. Here, the method of generating the information required for reproducing the subtitle data will be described with reference to an operation for performing configuration to change subtitles and detailed descriptions thereof will be omitted here.

The media data output unit 203 may combine the information required for reproducing subtitle data transferred from the subtitle change configuration unit 202 with the media data and may output multimedia content.

Although FIG. 5 illustrates the case in which the MMT reception device 200 is implemented as separate units, such as the MMT data reception unit 201, the subtitle change configuration unit 202, and the media data output unit 203, at least two of the MMT data reception unit 201, the subtitle change configuration unit 202, and the media data output unit 203 may be integrated into a single unit. Also, the MMT data reception unit 201, the subtitle change configuration unit 202, and the media data output unit 203 may be implemented as at least one processor.

In FIG. 5, an example of the internal structure of the MMT reception device in the MMT system according to an embodiment has been described. Subsequently, a process of changing subtitle data in an MMT system according to an embodiment will be described with reference to FIG. 6.

Figure 6:
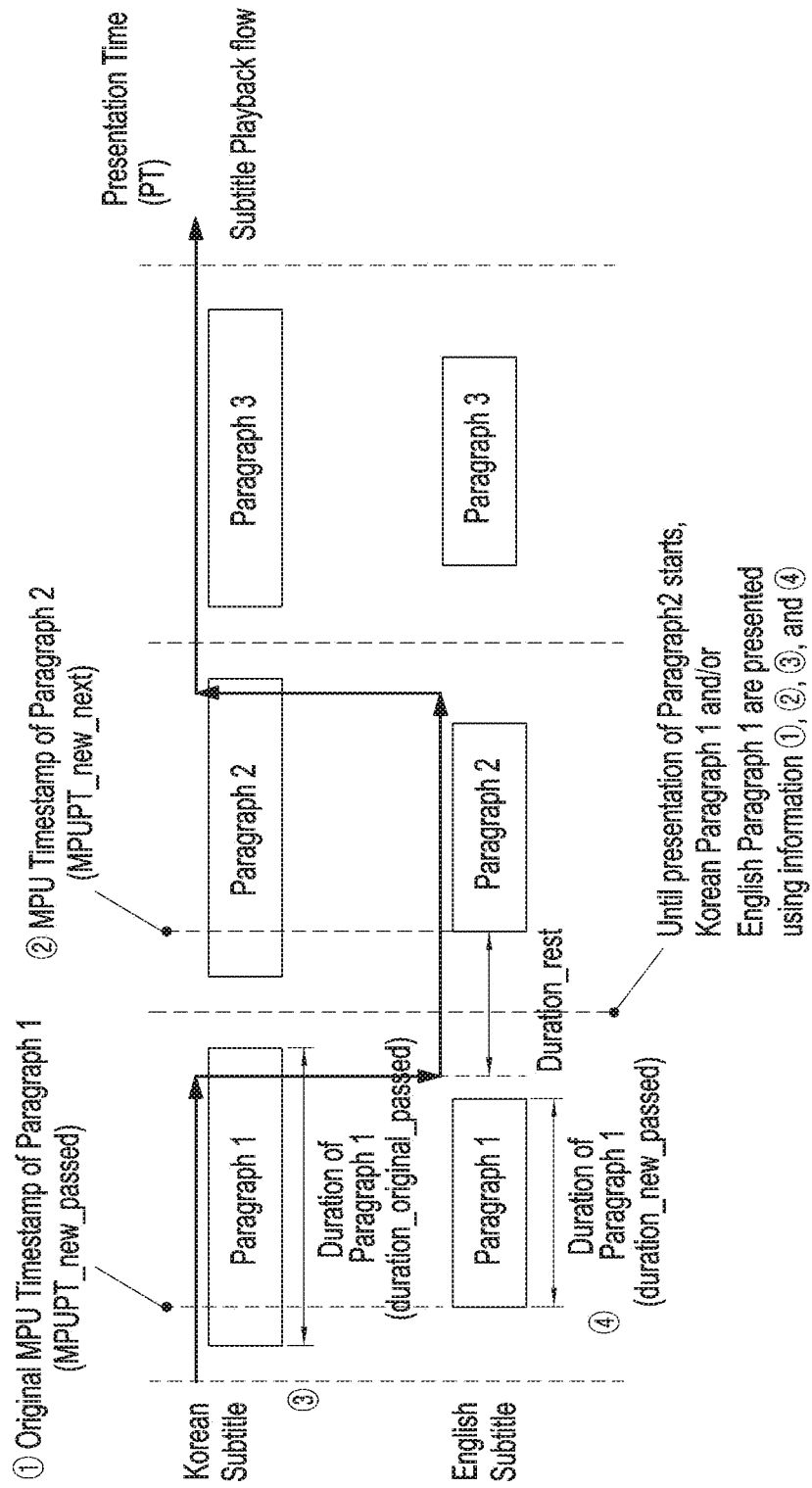
FIG. 6 is a diagram schematically illustrating a process of changing subtitle data in an MMT system according to an embodiment.

FIG. 6 is a diagram schematically illustrating a process of changing subtitle data in an MMT system according to an embodiment.

FIG. 6 illustrates a process of changing a first subtitle to a second subtitle on the basis of a presentation time of MMT media data. First, in FIG. 6, it is assumed that a first subtitle is, for example, Korean subtitles and that a second subtitle is, for example, English subtitles. Here, the Korean subtitles are the original subtitles, and the English subtitles are the subtitles to be changed to. In the first subtitle and the second subtitle, each paragraph is included in an MPU. Accordingly, the paragraph is transmitted via the MPU, and data corresponding to one or more paragraphs may be stored in a single MPU.

Also, as illustrated in FIG. 6, in the case in which a first subtitle is changed to a second subtitle at a subtitle-changing time while Paragraph 1 of the first subtitle is presented, if the presentation of Paragraph 1 of the second subtitle is already finished at the subtitle-changing time, a user of a terminal may not completely read any one of Paragraph 1 and Paragraph 2, and may need to wait for presentation of a subsequent paragraph of the second subtitle, that is, Paragraph 2 of the second subtitle.

In this instance, until the start of Paragraph 2 of the second subtitle, Paragraph 1 of the first subtitle and/or Paragraph 1 of the second subtitle may be replayed, so that the user of the terminal sufficiently experiences the context provided by the subtitle data. That is, previous subtitle data which has already passed is replayed during the empty period between the last paragraph of the first subtitle and the first paragraph of the second subtitle so that the user of the terminal may sufficiently experience the context provided by the subtitle data.

FIG. 6 illustrates a process of changing subtitle data in an MMT system according to an embodiment. Subsequently, a subtitle change descriptor in an MMT system according to an embodiment will be described.

In order to replay previous subtitle data during the empty period between the first subtitle and the second subtitle, that is, during a period of time during which no subtitles are provided due to changing from the first subtitle to the second subtitle, (i) a duration (Duration reset) during which subtitle data is to be replayed and (ii) subtitle data to be replayed need to be determined.

Therefore, an MMT transmission device needs to transmit a subtitle change descriptor to an MMT reception device so that the MMT reception device determines the duration during which the subtitle data is to be replayed and the subtitle data to be replayed.

The subtitle change descriptor may include (1) a presentation start time (MPUPT_new_passed) of Paragraph 1 of the second subtitle, (2) a presentation start time (MPUPT_new_next) of Paragraph 2 of the second subtitle, (3) a presentation duration (duration_original_passed) of Paragraph 1 of the first subtitle, and (4) a presentation duration (duration_new_passed) of Paragraph 1 of the second subtitle.

Here, the subtitle change descriptor may be expressed as shown in Tables 15 and 16. Tables 15 and 16 are described based on the case in which a single paragraph is stored in a single MPU. However, as described above, a single paragraph may be included in a single MPU, or multiple paragraphs may be included in a single MPU.

First, according to the MMT standard, a single package may correspond to a single program, for example, a news show, a soccer game, or the like. The single package may include subtitles in multiple languages, for example, English subtitles, Korean subtitles, and the like, together with video and audio data. In this instance, subtitle data of each language may be mapped to a single asset according to the MMT standard. Subtitles of each language may include presentation start time information and presentation end time information. Although subtitles of each language are produced for the same content, the length of subtitles of each language may differ depending on the characteristics of the corresponding language. Also, changing from subtitles in a predetermined language to subtitles in another language may be performed even during a transmission or rendering process. No information may be displayed on a screen for a predetermined duration because the time at which to perform changing has not reached the presentation start time of the new language subtitles. In this instance, the subtitles before changing, that is, the original subtitles, may be displayed instead, so that the user experience may be improved.

To this end, a server needs to describe related information in a subtitle change descriptor, and may transmit the subtitle change descriptor to the terminal. The subtitle change descriptor may include information associated with an MPU presentation time and duration for each subtitle MPU. The terminal may determine a subtitle asset to be displayed and the period of time during which the subtitle asset is to be displayed during an empty period (space period) before the presentation start time of subsequent subtitles on the basis of the information associated with the MPU presentation time and duration.

TABLE 15

Subtitle Change descriptor
[Introduction]

When an MMT Package is composed of multiple subtitle Assets, the subtitle Assets can be selectively delivered to MMT receiving entity. Each subtitle can be generated in various languages and the time information (such as begin time and end time of a certain subtitle data) of the subtitles for the same period of media can be different because of the lingual characteristics. The selected subtitle Asset can be changed to another subtitle Asset during its delivery and its presentation. If the subtitle Asset changed before it is completely presented and another subtitle Asset is already passed, the passed Assets can be presented while waiting for the next subtitle data. The Subtitle Change descriptor provides MPU presentation time and durations of the passed MPUs of both subtitle Assets. MMT sending entity shall send the Subtitle Change descriptor to MMT receiving entity, so the MMT receiving entity can decide which subtitle Asset to replay and the duration of replay before the presentation time of next MPU of the new subtitle Asset.

TABLE 16

| Syntax | Value | No. of bits | Mnemonic |
|---|---|---|---|
| Subtitle_Change_descriptor ( ) { | | | |
|   descriptor_tag | | 16 | uimsbf |
|   descriptor_length | | 16 | uimsbf |
|   MPUPT_new_passed | | 64 | uimsbf |
|   MPUPT_new_next | | 64 | uimsbf |
|   duration_original_passed | | 32 | uimsbf |
|   duration_new_passed | | 32 | uimsbf |
| } | | | |

Table 16 represents a subtitle change descriptor, that is, information that a server, that is, a subtitle server, transmits to the terminal so that the terminal determines the subtitles to be displayed, and the period of time during which the subtitles are to be displayed, according to an embodiment. Here, the meaning of each parameter included in Table 16 may be as shown in Table 17.

TABLE 17 descriptor_tag—a tag value indicating the type of a descriptor.
descriptor_length—indicates the length in bytes counting from the next byte after this field to the last byte of the descriptor.
MPUPT_new_passed—indicates the mpu presentation time of the passed MPU in changed subtitle Asset. The mpu_presentation_time is as same as defined in sub-clause 9.5.2.
MPUPT_new_next—indicates the mpu_presentation_time of the next MPU in changed subtitle Asset. The mpu_presentation_time is as same as defined in sub-clause 9.5.2.
duration_original_passed—indicates the presentation time duration of the passed MPU in original subtitle Asset. The duration_original_passed is expressed in milliseconds.
duration_new_passed—indicates the presentation time duration of the passed MPU in changed subtitle Asset. The duration_new_passed is expressed in milliseconds.

Also, in Table 17, a section, for example, section 9.5.2, indicates a section of the ISO/IEC 23008-1:2014(E) $1^{st}$ Edition standard.

In Table 17, the descriptor_tag field indicates a tag value indicating the type of a descriptor. The descriptor_length field indicates the length counted from a byte subsequent to the descriptor_length field to the last byte of the descriptor in bytes. The MPUPT_new_passed field indicates the mpu_presentation_time of a passed MPU which is included in a changed subtitle asset. The mpu_presentation_time is defined in section 9.5.2 of the ISO/IEC 23008-1:2014(E) $1^{st}$ Edition standard.

In Table 17, the MPUPT_new_next field indicates the mpu_presentation_time of a subsequent MPU in the changed subtitle asset. The mpu_presentation_time is defined in section 9.5.2 of the ISO/IEC 23008-1:2014(E) $1^{st}$ Edition standard.

In Table 17, the duration_original_passed field indicates the presentation time duration of a passed MPU in the original subtitle asset, and the duration_original_passed field is expressed in milliseconds.

In Table 17, the duration_new_passed field indicates the presentation time duration of a passed MPU in the changed subtitle asset, and the duration_new_passed field is expressed in milliseconds.

A subtitle descriptor is written as a subtitle change descriptor and may be included in an MP table as one of the asset descriptors of a subtitle asset. The MP table may be included in a PA message and may be transmitted from the MMT transmission device to the MMT reception device every time that information associated with assets included in the MMT package is changed.

Also, the subtitle descriptor may be transmitted independently from the MMT transmission device to the MMT reception device via a separate MMT signaling message, as opposed to the PA message. The signaling message including the subtitle descriptor may be, for example, a subtitle change message. The format of the subtitle change message may comply with the above-described MMT signaling information format.

Subsequently, a method of performing configuration to change subtitles in an MMT system according to an embodiment will be described with reference to FIG. 7.

Figure 7:
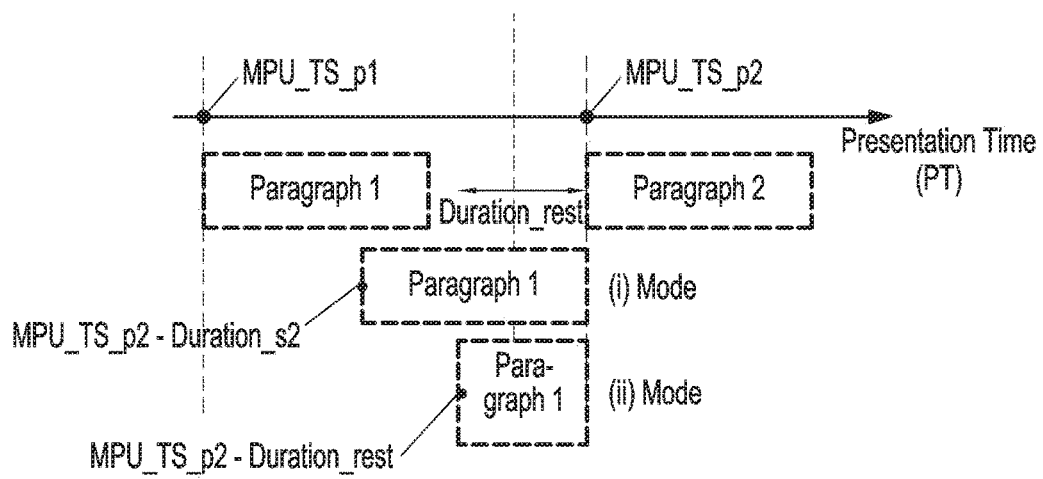
FIG. 7 is a diagram schematically illustrating a method of performing configuration to change subtitles in an MMT system according to an embodiment.

FIG. 7 is a diagram schematically illustrating a method of performing configuration to change subtitles in an MMT system according to an embodiment.

Referring to FIG. 7, an MMT reception device uses a subtitle change descriptor, transmitted from an MMT transmission device, in order to change metadata of subtitle data and deliver suitable subtitle data to a media data output unit.

Configuration to change subtitles is performed as follows.

1. An MMT reception device receives a subtitle change descriptor transmitted from a server.
   (1) the presentation start time of Paragraph 1 of a second subtitle (MPUPT_new_passed)
   (2) the presentation start time of Paragraph 2 of the second subtitle (MPUPT_new_next)
   (3) the presentation duration of Paragraph 1 of a first subtitle (duration_original_passed)
   (4) the presentation duration of Paragraph 1 of the second subtitle (duration_new_passed)
2. The MMT reception device calculates the empty period between Paragraph 1 of the second subtitle and Paragraph 2 of the second subtitle on the basis of (1), (2), and (4).
3. The MMT reception device determines a paragraph to be replayed until presentation of Paragraph 2 of the second subtitle begins, and a duration (Duration_rest) during which the paragraph is to be replayed, by taking into consideration the period calculated in #2 and the following items, that is, (1), (2), (3), (4), and (5).

Here, Duration_rest is the duration (=MPUPT_new_next) from the point in time at which changing subtitles is attempted to the point in time at which presentation of Paragraph 2 of the second subtitle begins.

In the existing MMT system, subtitles are not displayed on a screen during Duration_rest. However, according to an embodiment, subtitles may be displayed during Duration_rest in order to improve the user experience.

Therefore, a paragraph to be replayed during Duration_rest may be Paragraph 1 of the first subtitle, Paragraph 1 of the second subtitle, or both Paragraph 1 of the first subtitle and Paragraph 1 of the second subtitle. If both Paragraph 1 of the first subtitle and Paragraph 1 of the second subtitle are replayed, a duration for replaying Paragraph 1 of the first subtitle and a duration for replaying Paragraph 1 of the second subtitle may be determined to be the same as or different from each other. Here, a duration including both the duration for replaying Paragraph 1 of the first subtitle and the duration for replaying Paragraph 1 of the second subtitle may correspond to Duration_rest.

(1) the period calculated in 2.
(2) the content of the metadata of an MPU including Paragraph 1 of the first subtitle
(3) the content of the metadata of an MPU including Paragraph 1 of the second subtitle
(4) the characteristics of a decoder of the MMT reception device, for example, the characteristics of a media data decoder, wherein the characteristics of the decoder may include the capability of the decoder or the like
(5) the characteristics of a renderer of the MMT reception device, for example, the characteristics of a media renderer, wherein the characteristics of the render may include the capability of the render 4. The MMT reception device determines a replay mode of a paragraph to be replayed during Duration_rest determined in #3.

(1) a normal replay mode: perform replaying during a period of time corresponding to Duration_rest from the presentation end time of the determined paragraph (1× speed)
(2) a trick replay mode: replay the entirety of the determined paragraph within Duration_rest (presentation duration of the determined paragraph χ Duration_rest (i.e., replay duration)×speed)
(3) private mode: perform replaying according to a method determined by the MMT reception device 5. The MMT reception device may adjust the MPU presentation time (MPU_presentation_time) of the paragraph to be replayed on the basis of the replay mode determined in #4.

(1) normal replay mode: a time obtained by counting a replay duration of the determined paragraph backwards from the point in time indicated by MPUPT_new_next
(2) trick replay mode: a time obtained by counting a period of time corresponding to Duration_rest backwards from the point in time indicated by MPUPT_new_next
(3) private mode: counting backwards according to a method determined by the MMT reception device 6. In the case of the trick replay mode, the replay time of data included in the paragraph to be replayed is adjusted on the basis of the replay mode determined in 4. For example, when the determined paragraph includes N media samples, the replay duration of each media sample may be adjusted to be the replay duration of the determined paragraph χDuration_restχN. Here, the replay duration of the media sample may be included in MPU metadata.

7. Information and data determined in #2 to #6, along with related media data, are delivered to the renderer.

As described above, two or more paragraphs may be included in a single MPU. In this instance, instead of an MPU presentation time, the presentation start time of a first data unit of data included in a paragraph may be used.

Also, in the process of determining Duration_rest and the replay mode, a predetermined empty period may be provided before the start of Paragraph 2 of the second subtitle in consideration of the ratio of the empty period between Paragraph 1 and Paragraph 2 of the second subtitle to Duration_rest. In this instance, Duration_rest and the MPU_presentation_time of the determined paragraph additionally need to be adjusted.

An embodiment is based on the case of using an empty period, that is, a period of time until Paragraph 2 of a second subtitle is presented when a subtitle language is changed from a first language to the second language while Paragraph 1 of the first subtitle is being presented. However, video data is changed to a subsequent scene during the empty period. If previous subtitles for a previous scene are replayed, the subtitles may be quite different from the intention of the content and the user experience may deteriorate. Accordingly, depending on the decision made by the MMT reception device, the method according to an embodiment of the disclosure may not be performed for some portions of the entire content. That is, the MMT reception device may selectively apply the method according to an embodiment of the disclosure as the occasion demands. The MMT reception device makes decisions in consideration of context recognition technology for recognizing the context of content, user preference information, the age of a user, the speed at which a user reads words, the size of a display, the resolution of the display, the field of view of the display, spatial information of the display, a region of interest, or the like.

All the above-described operations for changing subtitles may be performed by the MMT reception device or may be performed by the MMT transmission device. If all operations for changing subtitles are performed in the MMT transmission device, the MMT reception device may perform normal operations for receiving and reproducing MMT data.

In FIG. 7, an example of the method of performing configuration to change subtitles in the MMT system according to an embodiment has been described. Subsequently, another example of the internal structure of the MMT transmission device in an MMT system according to an embodiment will be described with reference to FIG. 8.

Figure 8:
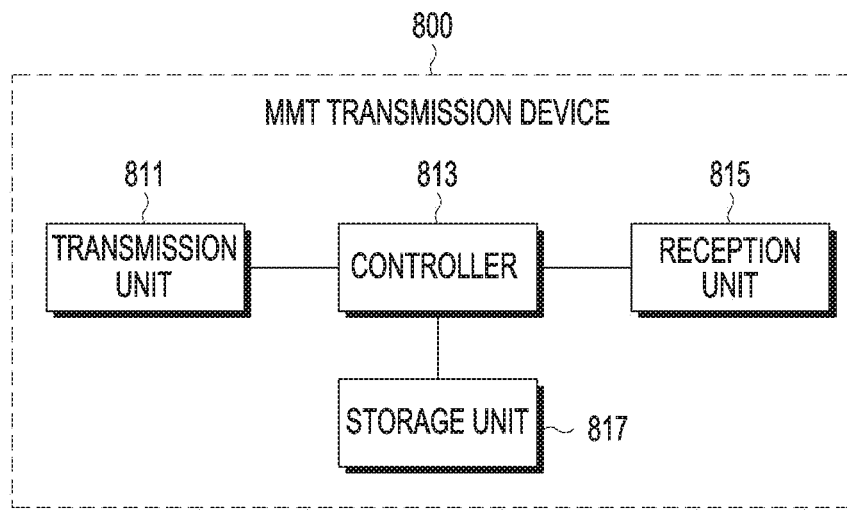
FIG. 8 is a diagram schematically illustrating another example of the internal structure of an MMT transmission device in an MMT system according to an embodiment.

FIG. 8 is a diagram schematically illustrating another example of the internal structure of an MMT transmission device in an MMT system according to an embodiment.

Referring to FIG. 8, an MMT transmission device 800 may include a transmission unit 811, a controller 813, a reception unit 815, and a storage unit 817.

First, the controller 813 may control the overall operation of the MMT transmission device 800. The controller 813 may control the MMT transmission device 800 to perform overall operation related to an operation of changing subtitles according to an embodiment. Here, the overall operation related to the operation of changing subtitles is the same as described with reference to FIGS. 1 to 7, and therefore, a detailed description thereof will be omitted.

The transmission unit 811 may transmit various types of data, various signals, and various messages to an MMT reception device or the like under the control of the controller 813. Here, the various types of data, various signals, and various messages that the transmission unit 811 transmits are the same as those of FIGS. 1 to 7, which have been described above, and thus, a detailed description thereof will be omitted.

Also, the reception unit 815 may receive various types of data, various signals, and various messages from the MMT reception device or the like under the control of the controller 813. Here, the various types of data, various signals, and various messages that the reception unit 815 receives are the same as those of FIGS. 1 to 7, which have been described above, and thus detailed descriptions thereof will be omitted.

The storage unit 817 may store programs and various types of data required for the operation of the MMT transmission device 800, particularly, information related to an operation of changing subtitles according to an embodiment. Also, the storage unit 817 may store various types of data, various signals, and various messages that the reception unit 815 receives from the MMT reception device or the like.

Although FIG. 8 illustrates that the MMT transmission device 800 is implemented as separate units, such as the transmission unit 811, the controller 813, the reception unit 815, and the storage unit 817, at least two of the transmission unit 811, the controller 813, the reception unit 815, and the storage unit 817 may be integrated into a single unit. Also, the transmission unit 811, the controller 813, the reception unit 815, and the storage unit 817 may be implemented as at least one processor.

In FIG. 8, an example of the internal structure of the MMT transmission device in the MMT system according to an embodiment has been described. Subsequently, an example of the internal structure of an MMT reception device in an MMT system according to an embodiment will be described with reference to FIG. 9.

Figure 9:
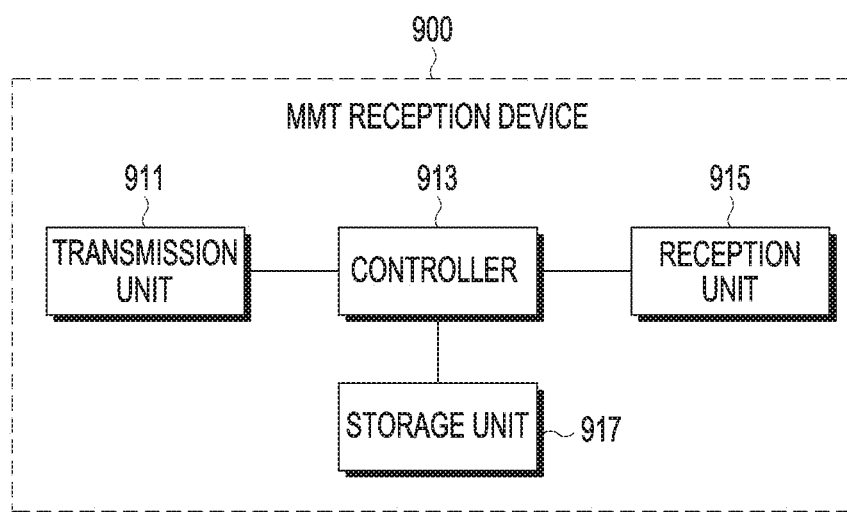
FIG. 9 is a diagram schematically illustrating another example of the internal structure of an MMT reception device in an MMT system according to an embodiment.

FIG. 9 is a diagram schematically illustrating another example of the internal structure of an MMT reception device in an MMT system according to an embodiment.

Referring to FIG. 9, an MMT reception device 900 may include a transmission unit 911, a controller 913, a reception unit 915, and a storage unit 917.

First, the controller 913 may control the overall operation of the MMT reception device 900. The controller 913 may control the MMT reception device 900 to perform overall operation related to an operation for changing subtitles according to an embodiment. Here, the overall operation related to the operation of changing subtitles is the same as that described with reference to FIGS. 1 to 7, and therefore, a detailed description thereof will be omitted.

The transmission unit 911 may transmit various types of data, various signals, and various messages to an MMT transmission device or the like under the control of the controller 913. Here, the various types of data, various signals, and various messages that the transmission unit 911 transmits are the same as those of FIGS. 1 to 7, which have been described above, and thus detailed descriptions thereof will be omitted.

Also, the reception unit 915 may receive various types of data, various signals, and various messages from the MMT transmission device or the like under the control of the controller 913. Here, the various types of data, various signals, and various messages that the reception unit 915 receives are the same as those of FIGS. 1 to 7, which have been described above, and thus, detailed descriptions thereof will be omitted.

The storage unit 917 may store programs and various types of data required for the operation of the MMT reception device 900, particularly, information related to an operation of changing subtitles according to an embodiment. Also, the storage unit 917 may store various types of data, various signals, and various messages that the reception unit 915 receives from the MMT transmission device or the like.

Although FIG. 9 illustrates that the MMT reception device 900 is implemented as separate units, such as the transmission unit 911, the controller 913, the reception unit 915, and the storage unit 917, at least two of the transmission unit 911, the controller 913, the reception unit 915, and the storage unit 917 may be integrated into a single unit. Also, the transmission unit 911, the controller 913, the reception unit 915, and the storage unit 917 may be implemented as at least one processor.

According to an embodiment, a transmission device in a multimedia system is provided. The transmission device may include a controller configured to detect a request to change from first-type data to second-type data while the first-type data is reproduced at a given point in time and a transmission unit configured to transmit information required for replaying at least one of data reproduced before the given point in time among the first-type data and data reproduced before the given point in time among the second-type data, before the second-type data is reproduced.

Here, when the first-type data includes a first-type first data unit and the second-type data includes a second-type first data unit, the information includes information required for replaying at least one of data reproduced before the given point in time among the first-type first data unit and data reproduced before the given point in time among the second-type first data unit, before the second-type first data unit is reproduced.

Here, the information includes: at least one selected from among a presentation time of a first third data unit included in a passed second data unit of the second-type first data unit, a presentation time of a first third data unit included in a subsequent second data unit of the second-type first data unit, a presentation duration of a passed second data unit of the first-type first data unit, and a presentation duration of the passed second data unit of the second-type first data unit.

The first data unit includes an asset, the second data unit includes a media-processing unit (MPU), and the third data unit includes an access unit.

The first-type data and the second-type data are associated with the same content.

According to an embodiment, a reception device in a multimedia system is provided. The reception device includes a controller, configured to detect a request to change from first-type data to second-type data while the first-type data is being reproduced at a given point in time, and a reception unit, configured to receive information required for replaying at least one of data reproduced before the given point in time among the first-type data and data reproduced before the given point in time among the second-type data, before the second-type data is reproduced.

Here, when the first-type data includes a first-type first data unit and the second-type data includes a second-type first data unit, the information includes information required for replaying at least one of data reproduced before the given point in time among the first-type first data unit and data reproduced before the given point in time among the second-type first data unit, before the second-type first data is reproduced.

Here, the information includes: at least one selected from among a presentation time of a first third data unit included in a passed second data unit of the second-type first data unit, a presentation time of a first third data unit included in a subsequent second data unit of the second-type first data unit, a presentation duration of a passed second data unit of the first-type first data unit, and a presentation duration of the passed second data unit of the second-type first data unit.

Here, the controller replays at least one of data reproduced before the given point in time among the first-type first data unit and data reproduced before the given point in time among the second-type first data unit, before the subsequent second data unit of the second-type first data unit is reproduced.

Here, the controllers identify an empty period between the passed second data unit of the second-type first data unit and the subsequent second data unit of the second-type first data unit on the basis of the presentation time of the first third data unit included in the passed second data unit of the second-type first data unit, the presentation time of the first third data unit included in the subsequent second data unit of the second-type first data unit, and the presentation duration of the passed second data unit of the second-type first data unit, determines at least one of data reproduced before the given point in time among the first-type first data unit and data reproduced before the given point in time among the second-type first data unit, to be an object to be replayed, and determining a time duration for replaying the object to be replayed, on the basis of the empty period, metadata of the passed second data unit of the first-type first data unit, metadata of the passed second data unit of the second-type first data unit, the capability of a decoder, and the capability of a renderer, and replays the object to be replayed at the time duration for replaying.

Here, the controller replays the object to be replayed at the time duration for replaying on the basis of one mode determined from among a first mode, a second mode, and a third mode, wherein the first mode includes a mode for replaying data corresponding to the time duration for replaying from a presentation end time of the object to be replayed, the second mode includes a mode for replaying an entirety of the object to be replayed within the time duration for replaying, and the third mode includes a mode for replaying the object to be replayed in the time duration for replaying on the basis of a scheme determined by the reception device.

Here, the controller adjusts a third data unit presentation time of the object to be replayed on the basis of the determined mode.

The first data unit includes an asset, the second data unit includes a media-processing unit (MPU), and the third data unit includes an access unit.

The first-type data and the second-type data are associated with the same content.

Particular aspects of the disclosure may be implemented as a computer-readable code in a computer-readable recording medium. The computer-readable recording medium is a predetermined data storage device which can store data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner. Further, functional programs, codes, and code segments for achieving the disclosure may be easily interpreted by programmers skilled in the art which the disclosure pertains to.

It will be understood that a method and apparatus according to an embodiment of the disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It can be also appreciated that the memory included in the mobile terminal is one example of machine-readable devices suitable for storing a program including instructions that are executed by a processor device to thereby implement embodiments of the disclosure.

Accordingly, the disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the disclosure appropriately includes equivalents of the program.

Further, an apparatus according to an embodiment of the disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Meanwhile, although the concrete embodiments of the disclosure have been described in the detailed description of the disclosure, various modifications can be made without departing from the scope of the disclosure. Therefore, the scope of the disclosure should not be defined as being limited to the embodiments, but should be defined by the appended claims and equivalents thereof

The invention claimed is:

1. A method of a transmission device in a multimedia system based on a moving picture experts group media transport (MMT) scheme, the method comprising:
generating a subtitle change descriptor related to a change of a first subtitle asset to a second subtitle asset; and
transmitting, to a reception device, a MMT signaling message including the subtitle change descriptor,
wherein the subtitle change descriptor includes:
a first field indicating presentation start time of a passed media processing unit (MPU) in the second subtitle asset,
a second field indicating presentation start time of a next MPU in the second subtitle asset,
a third field indicating presentation time duration of a passed MPU in the first subtitle asset, and
a fourth field indicating presentation time duration of the passed MPU in the second subtitle asset.

2. The method of claim 1, wherein the first subtitle asset comprises data of a first subtitle for a first language and the second subtitle asset comprises data of a second subtitle for a second language.

3. A method of a reception device in a multimedia system based on a moving picture experts group media transport (MMT) scheme, the method comprising:

receiving, from transmission device, a MMT signaling message including a subtitle change descriptor related to a change of a first subtitle asset to a second subtitle asset;

determining a passed media processing unit (MPU) to be presented before a presentation start time of a next MPU in the second subtitle asset and a presentation duration of the passed MPU, using the subtitle change descriptor; and presenting the passed MPU during the presentation duration, the passed MPU being included in the first subtitle asset or the second subtitle asset, wherein the subtitle change descriptor includes:
 a first field indicating presentation start time of a passed MPU in the second subtitle asset,
 a second field indicating the presentation start time of the next MPU in the second subtitle asset,
 a third field indicating presentation time duration of a passed MPU in the first subtitle asset, and
 a fourth field indicating presentation time duration of the passed MPU in the second subtitle asset.

4. The method of claim 3, wherein the first subtitle asset comprises data of a first subtitle for a first language and the second subtitle asset comprises data of a second subtitle for a second language.

5. A transmission device in a multimedia system based on a moving picture experts group media transport (MMT) scheme, the transmission device comprising:
 a transmitter; and
 a controller coupled with the transmitter and configured to control to:
  generate a subtitle change descriptor related to a change of a first subtitle asset to a second subtitle asset, and
  transmit, to a reception device, a MMT signaling message including the subtitle change descriptor,
 wherein the subtitle change descriptor includes:
  a first field indicating presentation start time of a passed media processing unit (MPU) in the second subtitle asset,
  a second field indicating the presentation start time of a next MPU in the second subtitle asset,
  a third field indicating presentation time duration of a passed MPU in the first subtitle asset, and
  a fourth field indicating presentation time duration of the passed MPU in the second subtitle asset.

6. The transmission device of claim 5, wherein the first subtitle asset comprises data of a first subtitle for a first language and the second subtitle asset comprises data of a second subtitle for a second language.

7. A reception device in a multimedia system based on a moving picture experts group media transport (MMT) scheme, the reception device comprising:
 a receiver; and
 at least one processor configured to:
  receive, from transmission device, a MMT signaling message including a subtitle change descriptor related to a change of a first subtitle asset to a second subtitle asset,
  determine a passed media processing unit (MPU) to be presented before a presentation start time of a next MPU in the second subtitle asset and a presentation duration of the passed MPU, using the subtitle change descriptor, and
  present the passed MPU during the presentation duration, the passed MPU being included in the first subtitle asset or the second subtitle asset,
 wherein the subtitle change descriptor includes:
  a first field indicating presentation start time of a passed MPU in the second subtitle asset,
  a second field indicating the presentation start time of the next MPU in the second subtitle asset,
  a third field indicating presentation time duration of a passed MPU in the first subtitle asset, and
  a fourth field indicating presentation time duration of the passed MPU in the second subtitle asset.

8. The reception device of claim 7, wherein the first subtitle asset comprises data of a first subtitle for a first language and the second subtitle asset comprises data of a second subtitle for a second language.

* * * * *